(12) United States Patent
Cernohous et al.

(10) Patent No.: US 9,708,457 B2
(45) Date of Patent: Jul. 18, 2017

(54) MOISTURE SCAVENGER COMPOSITION

(71) Applicant: Stratasys, Inc., Eden Prairie, MN (US)

(72) Inventors: Jeffrey Jacob Cernohous, Hudson, WI (US); Neil R. Granlund, Columbia Heights, MN (US)

(73) Assignee: Stratasys, Inc., Eden Prairie, MN (US)

( * ) Notice: Subject to any disclaimer, the term of this patent is extended or adjusted under 35 U.S.C. 154(b) by 150 days.

(21) Appl. No.: 13/793,600

(22) Filed: Mar. 11, 2013

(65) Prior Publication Data
US 2014/0005307 A1 Jan. 2, 2014

Related U.S. Application Data

(60) Provisional application No. 61/665,422, filed on Jun. 28, 2012.

(51) Int. Cl.
| | |
|---|---|
| *C08K 3/22* | (2006.01) |
| *B01J 20/26* | (2006.01) |
| *C08K 3/20* | (2006.01) |
| *B01J 20/04* | (2006.01) |
| *B01J 20/08* | (2006.01) |
| *B01J 20/24* | (2006.01) |
| *B01J 20/30* | (2006.01) |

(52) U.S. Cl.
CPC .............. *C08K 3/22* (2013.01); *B01J 20/041* (2013.01); *B01J 20/08* (2013.01); *B01J 20/24* (2013.01); *B01J 20/26* (2013.01); *B01J 20/261* (2013.01); *B01J 20/262* (2013.01); *B01J 20/3007* (2013.01); *C08K 3/20* (2013.01); *B01J 2220/4825* (2013.01); *B01J 2220/4831* (2013.01)

(58) Field of Classification Search
CPC ....................................................... C08K 3/22
USPC ....................................................... 524/433
See application file for complete search history.

(56) References Cited

U.S. PATENT DOCUMENTS

| | | | |
|---|---|---|---|
| 4,081,397 A * | 3/1978 | Booe | ............................. 252/194 |
| 4,863,538 A | 9/1989 | Deckard | |
| 5,121,329 A | 6/1992 | Crump | |
| 5,132,143 A | 7/1992 | Deckard | |
| 5,303,141 A | 4/1994 | Batchelder et al. | |
| 5,340,433 A | 8/1994 | Crump | |
| 5,474,719 A | 12/1995 | Fan et al. | |
| 5,503,785 A | 4/1996 | Crump et al. | |
| 5,695,707 A | 12/1997 | Almquist et al. | |
| 5,939,008 A | 8/1999 | Comb et al. | |
| 6,004,124 A | 12/1999 | Swanson et al. | |
| 6,022,207 A | 2/2000 | Dahlin et al. | |
| 6,070,107 A | 5/2000 | Lombardi et al. | |
| 6,129,872 A | 10/2000 | Jang | |
| 6,165,406 A | 12/2000 | Jang et al. | |
| 6,175,422 B1 | 1/2001 | Penn et al. | |
| 6,228,923 B1 | 5/2001 | Lombardi et al. | |
| 6,645,412 B2 | 11/2003 | Priedeman, Jr. | |
| 6,722,872 B1 | 4/2004 | Swanson et al. | |
| 6,790,403 B1 | 9/2004 | Priedeman, Jr. et al. | |
| 6,814,907 B1 | 11/2004 | Comb | |
| 7,236,166 B2 | 6/2007 | Zinniel et al. | |
| 7,255,821 B2 | 8/2007 | Priedeman, Jr. et al. | |
| 7,754,807 B2 | 7/2010 | Priedeman, Jr. et al. | |
| 8,246,888 B2 | 8/2012 | Hopkins et al. | |
| 2004/0075193 A1* | 4/2004 | Danzik | ........................ 264/310 |
| 2004/0222561 A1 | 11/2004 | Hopkins | |
| 2005/0004282 A1 | 1/2005 | Priedeman, Jr. et al. | |
| 2008/0213419 A1 | 9/2008 | Skubic et al. | |
| 2009/0258977 A1* | 10/2009 | Smetana | ...................... 524/100 |
| 2010/0096072 A1 | 4/2010 | Hopkins et al. | |
| 2010/0096485 A1 | 4/2010 | Taatjes et al. | |
| 2010/0140849 A1 | 6/2010 | Comb et al. | |
| 2011/0291046 A1* | 12/2011 | Patrone et al. | ............... 252/194 |

* cited by examiner

*Primary Examiner* — Lanee Reuther
(74) *Attorney, Agent, or Firm* — Westman, Champlin & Koehler, P.A.

(57) ABSTRACT

A moisture scavenger composition to address the processing of moisture sensitive materials or high moisture content materials in melt processable feed stocks. The moisture scavenger includes a desiccant, an elastomeric dispersant, and an optional hydrophillic synergist.

16 Claims, No Drawings

MOISTURE SCAVENGER COMPOSITION

BACKGROUND

Polymeric materials and their corresponding additives and fillers may have excessive moisture levels that can adversely affect both their melt processing and the physical characteristics of the resulting finished composite. For example, moisture levels of cellulosic fillers added to a polymeric matrix may negatively impact the finished composite. Conventional processing of moisture laden materials is generally addressed through special production equipment to insure moisture is removed from the cellulosic filler prior to it being melt processed with a polymeric material. The presence of moisture leads to irregular foaming and surface defects in the extruded material. Higher production costs and increased product variability often result. One conventional approach is drying the raw materials prior to melt processing to reduce their moisture levels. However, drying has several disadvantages. First, it requires additional capital expense to install drying and handling equipment. Second, there are added energy costs associated with drying the filler.

SUMMARY

The moisture scavenger compositions of this disclosure enable a different approach to address the processing of moisture sensitive materials or high moisture content materials. In some embodiments a melt processable moisture scavenger is capable of addressing excess moisture present in the desired melt processable feed stock. The moisture scavenger includes a desiccant and an elastomeric dispersant. The elastomeric dispersant has a melting temperature lower than a melting temperature of the desiccant and the thermoplastic matrix that it is melt processed with. The moisture scavenger is utilized directly in the melt processing equipment to address excessive moisture in polymeric, additive, or filler materials. In another embodiment, the moisture scavenger includes a desiccant, an elastomeric dispersant, and a hydrophilic synergist to enable the efficient dispersion and moisture uptake of the moisture scavenger composition during melt processing.

Melt processable polymeric materials, hereinafter referred to as a polymeric matrix, are often combined with certain fillers, additives, or both to enhance the economics and to impart desired physical characteristics to the processed material. These may often encompass moisture sensitive fillers, including various organic material or inorganic material mixed throughout the polymeric host material. For example, wood flour or wood fibers are often included with certain hydrocarbon polymers to make a composite that is suitable to be used as a structural building material upon melt processing.

Also described are methods for producing composite materials that rely on melt processing techniques. Non-limiting examples of melt processes amenable to this invention include methods such as extrusion, injection molding, blow molding, rotomolding and batch mixing.

For purposes of this disclosure, the following terms shall have the following meanings:

"Melt Defects" mean undesirable problems that arise when processing a polymer matrix at elevated temperatures and under shear (e.g., melt fracture, surface roughness, edge tear, sharkskin).

"Moisture Scavenger" means a material that can improve the processing of composite materials by reacting with or binding water during melt processing.

"Desiccant" means a material that can effectively irreversibly react with or bind water under melt processing conditions.

"Hydrophilic Synergist" means a water soluble or dispersible material that when combined with a desiccant improves the efficacy or kinetics of the desiccant's reaction with moisture.

"Polymeric Matrix" means a melt processable polymeric material.

"Melt Processable Composition" means a formulation that is melt processed, typically at elevated temperatures, by means of a conventional polymer processing technique such as extrusion or injection molding as an example.

"Filler" means an organic or inorganic material that does not possess viscoelastic characteristics under the conditions utilized to melt process the filled polymeric matrix.

"Cellulosic Material" means natural or man-made materials derived from cellulose. Cellulosic materials include, for example: wood flour, wood fibers, sawdust, wood shavings, newsprint, paper, flax, hemp, grain hulls, kenaf, jute, sisal, nut shells or combinations thereof.

"Dispersant" means an elastomeric material that is capable of enhancing the distribution of a given material throughout a polymeric matrix during melt processing.

The above summary is not intended to describe each disclosed embodiment or every implementation. The detailed description that follows more particularly exemplifies illustrative embodiments.

DETAILED DESCRIPTION

A number of embodiments of moisture scavenger compositions are described herein. In certain embodiments, a moisture scavenger includes a desiccant and a dispersant. In another embodiment, a moisture scavenger comprises a desiccant, and elastomeric dispersant and optionally, a hydrophilic synergist. The moisture scavenger composition with enhanced dispersion capabilities is utilized to process melt processable materials, such as thermoplastics. Additionally, the moisture scavenger is well suited to address melt processable compositions containing moisture laden additives and fillers.

The desiccant comprises an additive that effectively reacts with moisture during the melt processing of composite materials containing moisture sensitive, or moisture laden, additives and fillers. The desiccant is combined with an elastomeric dispersant and optionally a hydrophilic synergist. The dispersant will melt and enable the timely dispersion of desiccant throughout the polymeric matrix during melt processing. The optional hydrophilic synergist acts to improve the efficacy of the desiccant material at scavenging moisture during melt processing. Suitable desiccants chemically react or bind moisture within the composite formulation in an irreversible fashion under typical melt processing conditions. Non-limiting examples of desiccants include metal oxides (e.g., calcium oxide, magnesium oxide and zinc oxide), metal halides (e.g., calcium chloride, magnesium chloride and zinc chloride) and combinations thereof. The desiccant is present in the moisture scavenger at levels of about 25% to about 95% by weight. More preferably, the desiccant is present in the moisture scavenger at levels of about 50% to about 80%. Most preferably, the desiccant is present in the moisture scavenger at levels of about 60% to about 70%.

The dispersant is generally an elastomeric material that will enable the desiccant to timely disperse throughout a desired polymeric matrix during processing. In certain embodiments, the dispersant has a melting temperature lower than a melting temperature of the desiccant. This enables the timely dispersion of desiccant throughout the polymeric matrix. The dispersant is not necessarily compatible with a polymeric matrix. Those of ordinary skill in the art with knowledge of this disclosure are capable of identifying and matching selected dispersants to polymeric matrices for desired composites. In certain embodiments, the dispersant is a polyolefin elastomeric polymer. Non-limiting examples include polyolefin elastomers, such as Engage 8003 from the Dow Chemical Company (Midland, Mich.). The dispersant is generally present in the moisture scavenger composition at about 5% to 65% by weight. More preferably, the dispersant is present in the moisture scavenger composition from about 20% to 50% by weight. Most preferably, the dispersant is present in the moisture scavenger composition from about 30% to about 40% by weight.

In another embodiment, the moisture scavenger comprises a desiccant, a dispersant, and a hydrophilic synergist. The hydrophilic synergist may also act to help disperse the desiccant in the polymeric matrix, subsequently exposing more surface area to moisture and improving the overall kinetics and efficiency of the moisture scavenging event. Non-limiting examples of suitable hydrophilic synergists include polyalkylene oxide polymers and copolymers and polyvinyl alcohol copolymers, and organic polyols (e.g., glycerol, pentaerythirtol). The hydrophilic synergist is generally present in the moisture scavenger composition at about 1% to 20% by weight.

The moisture scavenger composition may be prepared using various processes. The compound may be dry processed by blending the individual components in conventional dry blending equipment. In another embodiment, the components may be melt processed and subsequently pelletized for later use and application as provided in this disclosure. With the latter, the desiccant may be preferentially encased or shielded by the dispersant and other optional components to prevent the undesired uptake of moisture from ambient storage conditions. Those of ordinary skill in the art with knowledge of this disclosure are capable of selecting a preparation process well suited for a desired application.

The amount of moisture scavenger present in the melt processable composition is dependent upon the overall level of moisture present in the composition. Typically, an equimolar amount of moisture scavenging is required for every mole of water present in the other components of the composition. The appropriate amount of moisture scavenger is the amount needed to achieve the desired processing characteristics for the specific composite formulation. In some embodiments, the moisture scavenger is used at 0.05% to 20% by weight of the composite. Alternatively, the additive level is between 0.1% and 10.0% and may even be between 0.25% and 5.0%.

In another embodiment, the melt processable composition may contain other additives. Non-limiting examples of conventional additives include antioxidants, light stabilizers, fibers, antiblocking agents, heat stabilizers, impact modifiers, biocides, compatibilizers, flame retardants, plasticizers, tackifiers, colorants, processing aids, lubricants, coupling agents, and pigments. The additives may be incorporated into the melt processable composition in the form of powders, pellets, granules, or in any other extrudable form. The amount and type of conventional additives in the melt processable composition may vary depending upon the polymeric matrix and the desired physical properties of the finished composition. The appropriate amounts and types of additives should be selected to match with a specific polymeric matrix and achieve the desired physical properties of the finished material.

Conventionally recognized polymeric matrices and fillers might be utilized to form the polymeric composite suitable for melt processing. The polymeric matrices may be either hydrocarbon or non-hydrocarbon polymers. In one embodiment, the polymeric matrix is an olefin-based polymer.

The polymeric matrix functions as the host polymer and is a primary component of the melt processable composition. A wide variety of melt processable polymers are suitable for use as the polymeric matrix. The polymeric matrix includes at least substantially all of the polymers that are sometimes referred to as being difficult to melt process, especially when combined with an interfering element. They include both hydrocarbon and non-hydrocarbon polymers. Examples of useful polymeric matrices include, but are not limited to, polyamides, polyimides, polyurethanes, polyolefins, polystyrenes, polyesters, polycarbonates, polyketones, polyureas, polyvinyl resins, polyacrylates and polymethylacrylates.

In some embodiments, polymeric matrices may include, a high density polyethylene, low density polyethylene, linear low density polyethylene, polypropylene, polyolefin copolymers, polystyrene, polystyrene copolymers, polyacrylates, polymethacrylates, polyesters, polyvinylchloride, fluoropolymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, liquid crystal polymers or combinations thereof.

Polymeric matrices that are derived from recycled plastics may also be suitable as well as desirable due to lower cost. However, these materials may be problematic to process because they are often derived from materials coming from multiple waste streams having vastly different melt rheologies. The processing of such materials with fillers can be even more problematic, especially if the fillers have high loading levels of water or are moisture sensitive. Thus the moisture scavenger may have significant commercial impact because it will allow very low cost, filled recycled plastics to be converted into useful products using conventional melt processing techniques.

The polymeric matrix is included in the melt processable compositions in amounts of about 30% by weight. The amount of polymeric matrix will vary depending upon, for example, the type of polymer, the type of filler, the processing equipment, processing conditions and the desired end product.

The fillers are generally those organic or inorganic materials utilized as fillers or additives in the polymer composite industry. The additives described herein may be especially beneficial when used with moisture sensitive fillers such as volcanic ash, talc, mica, alumina, silica, and cellulosic materials.

The amount of the filler in the melt processable composition may vary depending upon the polymeric matrix and the desired physical properties of the finished composition. The appropriate amount of filler is selected to match with a specific polymeric matrix in order to achieve the desired physical properties of the finished material. Typically, the filler may be incorporated into the melt processable composition in amounts of no more than about 80% by weight. Additionally, the filler may be provided in various forms depending on the specific polymeric matrices and end use applications.

Cellulosic materials are commonly utilized in melt processable compositions to impart specific physical characteristics or to reduce cost of the finished composition. Cellulosic materials generally include natural or wood based materials having various aspect ratios, chemical compositions, densities, and physical characteristics. Non-limiting examples of cellulosic materials include wood flour, wood fibers, sawdust, wood shavings, newsprint, paper, flax, hemp, rice hulls, kenaf, jute, sisal, peanut shells. Combinations of cellulosic materials, or cellulosic materials with other interfering elements, may also be used in the melt processable composition.

The compositions described herein improve the processibility and reduce the surface defects encountered when melt processing polymeric matrices containing fillers or other polymeric components that possess relatively high moisture levels that adversely affect melt processing or finished composite properties. For purposes of this disclosure, melt processing compositions are those that are capable of being processed while at least a portion of the composition is in a molten state. The methods used to melt process the novel compositions may also present an improvement over conventional techniques. Conventionally recognized melt processing methods and equipment may be employed in processing the compositions described herein. Non-limiting examples of melt processing practices include extrusion, injection molding, batch mixing, blow molding and rotomolding. In another embodiment, the moisture scavenger composition may be employed in thermal compression bonding processes, such as for example, a continuous double belt press.

The melt processable composition can be prepared by any of a variety of ways. For example, the polymeric matrix and the moisture scavenger can be combined together by any of the blending means usually employed in the plastics industry, such as with a compounding mill, a Banbury mixer, or a mixing extruder in which the processing additive is uniformly distributed throughout the host polymer. The moisture scavenger and the host polymer may be used in the form, for example, of a powder, a pellet, or a granular product.

The moisture scavenger can be pre-compounded to form a concentrate and subsequently added to a polymeric matrix to improve dispersion, processibility, and reduce melt defects. For example, the moisture scavenger may be supplied separately as a pellet or master batch concentrate to the melt processable composition.

Melt-processing typically is performed at a temperature from 120° C. to 300° C., although optimum operating temperatures are selected depending upon the melting point, melt viscosity, and thermal stability of the composition. Different types of melt processing equipment, such as extruders, may be used to process the melt processable compositions of this invention.

The melt processable compositions may be utilized to make items such as building materials and automotive components. Non-limiting examples include, residential decking, automotive interior components, roofing, siding, window components, and decorative trim.

What is claimed is:

1. A composition comprising a host polymeric matrix with one or more moisture sensitive fillers and a melt processable moisture scavenger comprising a dispersant with a desiccant encased within the dispersant, wherein the dispersant comprises an elastomeric material, wherein the composition is configured to be melt processed such that when at melt processing conditions, the moisture scavenger disperses through the host polymeric matrix and chemically bonds with moisture released by the one or more moisture sensitive fillers.

2. The composition according to claim 1, wherein the one or more moisture sensitive fillers is selected from the group consisting of volcanic ash, talc, mica, alumina, silica and cellulose materials.

3. The composition according to claim 1, wherein the host polymeric matrix is a high density polyethylene, low density polyethylene, linear low density polyethylene, polypropylene, polyolefin copolymers, polystyrene, polystyrene copolymers, polyacrylates, polymethacrylates, polyesters, polyvinylchloride, fluoropolymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, liquid crystal polymers or combinations thereof.

4. The composition according to claim 1, wherein the moisture scavenger is present in the range of approximately 0.05% to 20% by weight of the composition.

5. The composition according to claim 1, wherein the moisture scavenger is present in the range of approximately 0.25% to 5.0% by weight of the composition.

6. The composition according to claim 1, wherein the desiccant is selected from the group consisting of calcium oxide, magnesium oxide, strontium oxide, barium oxide, aluminum oxide, and combinations thereof.

7. The composition according to claim 1, wherein the dispersant is a polyolefin elastomer.

8. The composition according to claim 1, wherein the moisture scavenger is present at less than about 5% by weight of the composition.

9. The composition according to claim 1, further comprising a hydrophilic synergist within the moisture scavenger.

10. The composition according to claim 9, wherein the moisture scavenger is present at less that about 5% by weight of the composition.

11. The composition according to claim 9, wherein the hydrophilic synergist is selected from the group consisting of polyalkylene oxide polymers and copolymers, polyvinyl alcohol copolymers, and organic polyols.

12. The composition according to claim 9, wherein the hydrophilic synergist ranges from about 1% to 20% by weight of the moisture scavenger.

13. The composition according to claim 1, wherein the dispersant comprises between about 5% to 65% by weight of the moisture scavenger.

14. The composition according to claim 1, wherein the dispersant comprises between about 30% to 40% by weight of the moisture scavenger.

15. A method comprising melt processing a host polymeric matrix with one or more moisture sensitive fillers and a melt processable moisture scavenger comprising a dispersant encasing a desiccant, the dispersant comprising an elastomeric material, to form a polymeric composite, wherein the desiccant and the dispersant are formed into the moisture scavenger prior to combining with the host polymeric matrix wherein the desiccant chemically reacts with moisture released from the one or more moisture sensitive fillers when melt processed.

16. The method of claim 15, wherein the one or more moisture sensitive fillers is selected from the group consisting of volcanic ash, talc, mica, alumina, silica and cellulose materials.

* * * * *